(12) United States Patent
Neri

(10) Patent No.: US 7,215,051 B2
(45) Date of Patent: May 8, 2007

(54) SINGLE-PHASE MOTOR PARTICULARLY FOR SUBMERSED PUMPS

(75) Inventor: Franco Neri, Padua (IT)

(73) Assignee: Franklin Electric Co., Inc., Bluffton, IN (US)

( * ) Notice: Subject to any disclaimer, the term of this patent is extended or adjusted under 35 U.S.C. 154(b) by 215 days.

(21) Appl. No.: 10/148,670

(22) PCT Filed: Apr. 6, 2001

(86) PCT No.: PCT/EP01/04005

§ 371 (c)(1),
(2), (4) Date: Jun. 3, 2002

(87) PCT Pub. No.: WO01/78225

PCT Pub. Date: Oct. 18, 2001

(65) Prior Publication Data

US 2002/0171301 A1 Nov. 21, 2002

(30) Foreign Application Priority Data

Apr. 11, 2000 (IT) .......................... PD2000A0085

(51) Int. Cl.
*H02K 5/10* (2006.01)
(52) U.S. Cl. .................... 310/87; 310/88; 310/68 R
(58) Field of Classification Search .............. 310/87, 310/86, 68 R; 417/423.3
See application file for complete search history.

(56) References Cited

U.S. PATENT DOCUMENTS

| | | | | |
|---|---|---|---|---|
| 2,428,816 A | * | 10/1947 | Sigmund et al. | 310/86 |
| 2,654,848 A | * | 10/1953 | Schaefer | 310/86 |
| 2,698,911 A | * | 1/1955 | Schaefer | 310/86 |
| 2,777,961 A | * | 1/1957 | Penlington | 310/86 |
| 3,011,083 A | | 11/1961 | Allan | |
| 3,457,867 A | | 7/1969 | Komor et al. | |
| 3,604,964 A | * | 9/1971 | Conrad et al. | 310/71 |
| 3,631,275 A | * | 12/1971 | Conrad et al. | 310/71 |
| 3,761,750 A | * | 9/1973 | Green | 310/87 |
| 4,358,634 A | * | 11/1982 | Dienes | 174/88 R |
| 4,546,300 A | * | 10/1985 | Shaikh | 318/786 |
| 4,547,689 A | * | 10/1985 | Tsuchimoto et al. | 310/87 |
| 4,768,888 A | * | 9/1988 | McNaull | 310/87 |
| 5,028,218 A | * | 7/1991 | Jensen et al. | 417/423.3 |
| 5,548,169 A | * | 8/1996 | Iwasa et al. | 310/68 R |
| 6,022,196 A | * | 2/2000 | Jensen et al. | 310/87 |
| 6,359,353 B1 | * | 3/2002 | Bevington | 310/87 |

FOREIGN PATENT DOCUMENTS

| | | |
|---|---|---|
| DE | 31 17 475 | 11/1982 |
| FR | 2 555 652 | 5/1985 |
| FR | 2555652 A1 * | 5/1985 |
| JP | 10094211 A * | 4/1998 |

OTHER PUBLICATIONS

Patent Abstracts of Japan vol. 1996, No. 05, May 31, 1996 & JP 08 028489 A (Tsurumi Mfg Co Ltd; Others:01) Jan. 30, 1996 abstract.

* cited by examiner

*Primary Examiner*—Thanh Lam
(74) *Attorney, Agent, or Firm*—Marshall, Gerstein & Borun LLP

(57) ABSTRACT

A single-phase motor (10) particularly for submersed pumps, characterized in that it comprises an annular capacitor (14) interposed between the pump coupling head (15) and the stator winding pack (12).

3 Claims, 2 Drawing Sheets

SINGLE-PHASE MOTOR PARTICULARLY FOR SUBMERSED PUMPS

BACKGROUND OF THE INVENTION

The present invention relates to a single-phase motor particularly for submersed pumps.

The motor that is normally used is a single-phase asynchronous motor which requires two stator windings in quadrature for starting.

One of the methods used in order to achieve the phase shifting of the two windings is to interpose a permanently-connected capacitor at the power supply of one of the windings.

This kind of motor is constituted by a substantially cylindrical body which contains the pack of stator windings which actuate the rotation of a rotor whose head portion protrudes at the pump coupling head.

The combined motor-pump device is used in wells which can be up to a few hundred meters deep.

If the capacitor is integrated in the motor control panel, it is necessary to carry its electrical connections to the motor, using a cable with three leads plus the ground wire.

In order to solve this problem, one possible solution is to provide the motors with an internal capacitor, providing the connections inside said motor and leading out of the motor with a cable having two leads plus the ground wire.

This solution allows to connect the motor directly to the mains power supply.

In some existing solutions, the cylindrical container of the motor is provided with a compartment for accommodating the capacitor at the lower part, i.e., opposite the pump coupling head.

Although the integration of the capacitor in the motor body allows to eliminate the electrical panel, this solution has drawbacks.

As mentioned, the capacitor is in fact arranged at the lower part of the motor, i.e., at the opposite end with respect to the pack of the stator windings and to the electrical connections which normally exit from the pump coupling head.

The power supply cables of the capacitor must therefore be appropriately insulated and pass through the entire motor, adjacent to the stator winding pack, increasing the complexity of the geometry of the motor, or it is necessary to provide an appropriate winding with the power supply connections on one side and the capacitor connections on the opposite side, but this makes it complicated, if not impossible, to produce the winding automatically.

SUMMARY OF THE INVENTION

The aim of the present invention is to solve or substantially reduce the problems of conventional single-phase motors for submersed pumps.

An important object is to provide a motor which allows direct connection to the line without interposing a panel which contains a capacitor, reducing the number of leads.

Another object is to eliminate the electrical connections that pass at the stator windings or the need to provide a special winding.

This aim and these and other objects which will become better apparent hereinafter are achieved by a single-phase motor particularly for submersed pumps, characterized in that it comprises an annular capacitor which is interposed between the pump coupling head and the stator winding pack.

BRIEF DESCRIPTION OF THE DRAWINGS

Further characteristics and advantages of the invention will become better apparent from the description of a preferred but not exclusive embodiment thereof, illustrated only by way of non-limitative example in the accompanying drawings, wherein.

DESCRIPTION OF THE PREFERRED EMBODIMENTS

Figure 1:
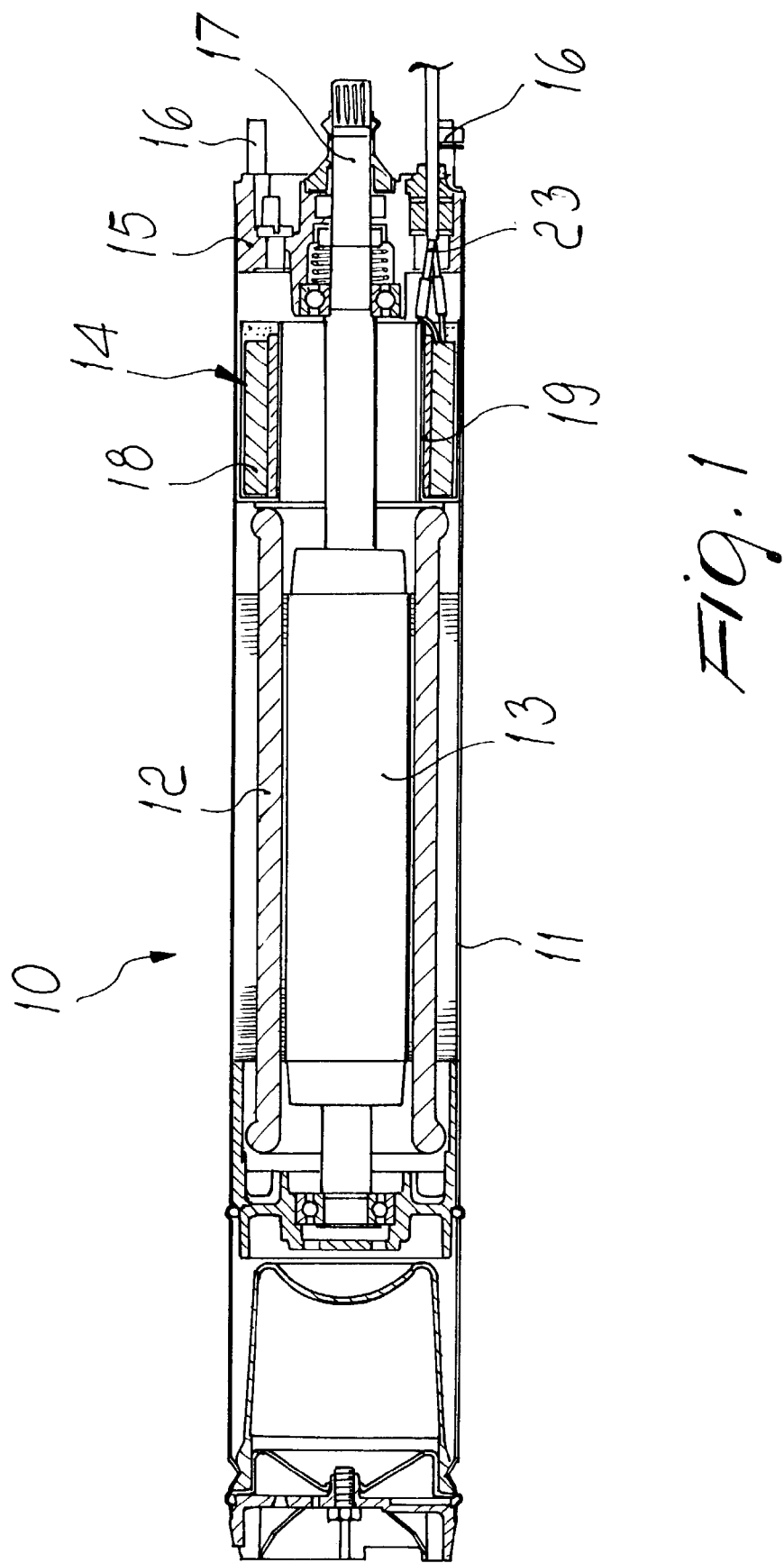
FIG. 1 is a longitudinal sectional view of a motor according to the invention.
Figure 2:
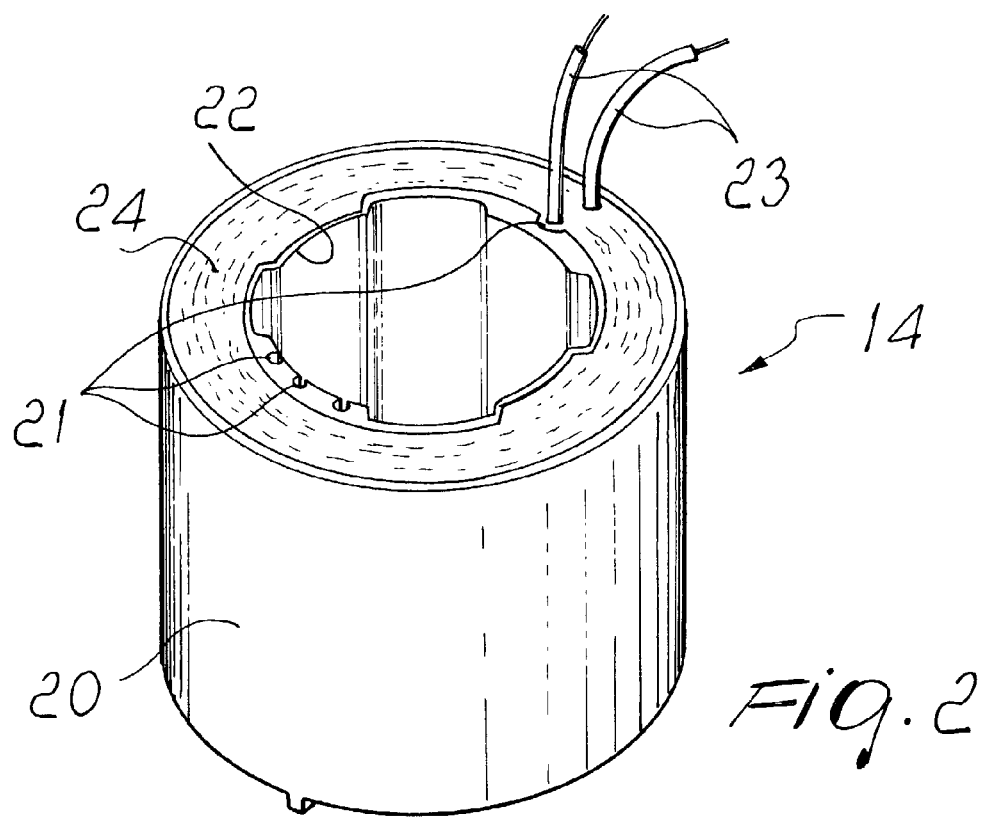
FIG. 2 is a perspective view of a capacitor used in the motor of FIG. 1.
Figure 3:
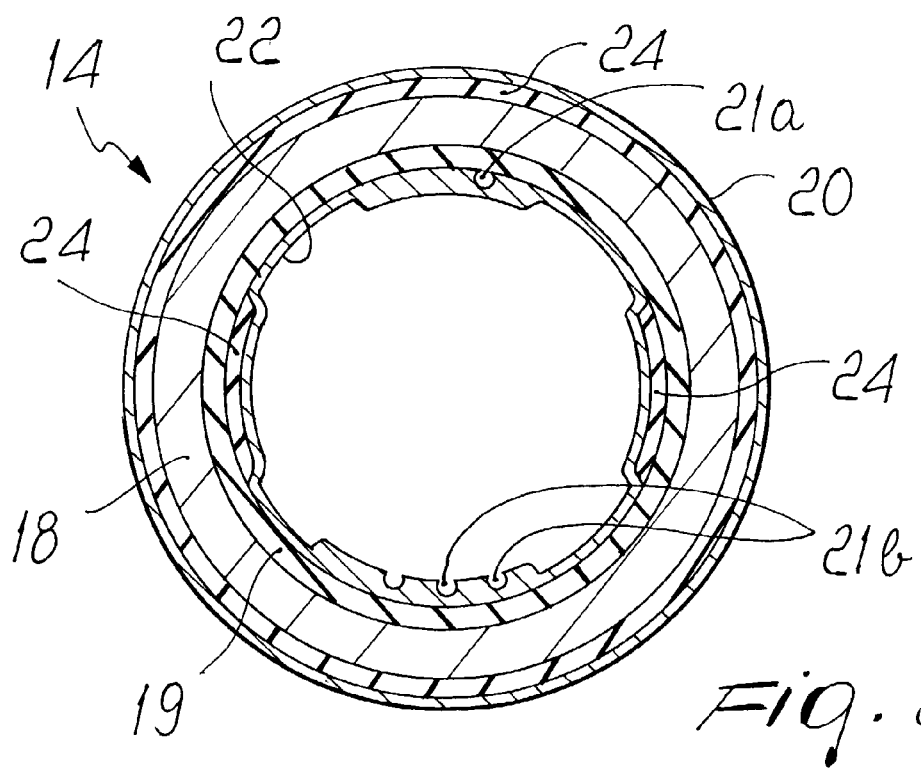
FIG. 3 is a cross sectional view of the capacitor of FIG. 2.

With reference to the figures, a motor particularly for submersed pumps according to the invention is generally designated by the reference numeral 10.

The motor 10 is a single-phase asynchronous motor contained in a substantially cylindrical box-like body 11.

The body 11 contains a pack 12 of stator windings, among which a rotor 13 is included.

The pack of stator windings 12 is constituted by two separate stator windings, one of which is connected to the power supply and the other one is connected to a capacitor generally designated by the reference numeral 14.

The capacitor 14 is an annular capacitor interposed between the pack of stator windings 12 and the pump coupling head 15.

In practice, the head 15 is provided with threaded elements 16 for fixing the pump, which is not shown in the figure but is in any case of a per se known type, and the head portion 17 of the rotor 13 protrudes from it.

The head portion 17 couples to the pump shaft.

The capacitor 14, advantageously a film capacitor, is constituted by longitudinally elongated plates 18 which are wound around a tubular support 19 and are contained in a tubular box-like element 20 which is resin-filled at the head for the insertion of the plates 18.

The box-like element 20 is provided with internal and external longitudinal slots 21 at the inner tubular wall 22.

In particular, the internal longitudinal slot 21a is used for the passage of the connecting wires 23 of the plates 18, while the external longitudinal slots 21b are used for the passage of the power supply wires of the stator winding pack 12.

Finally, the tubular box-like element 20 is filled with resin 24 so as to insulate the plates 18.

In practice it has been found that the invention has achieved the intended aim and objects.

In particular, it is evident that the particular shape of the capacitor allows said capacitor be placed in an advantageous position.

The disclosures in Italian Patent Application No. PD2000A000085 from which this application claims priority are incorporated herein by reference.

What is claimed is:

1. A single-phase split-capacitor submersible motor particularly for submersed pumps, comprising:
    a submersible housing;
    first and second end bells closing respective ends of the housing, the housing and the first and second end bells defining a stator chamber;
    a stator winding pack disposed in the stator chamber, the stator winding pack including a main field winding and an auxiliary winding; and a permanently connected annular film capacitor coupled in series with the auxiliary winding, the capacitor located in the stator chamber axially disposed between the stator winding pack and one of the first and second end bells;

wherein said annular film capacitor comprises longitudinally elongated plates wound around a tubular support and contained in a resin-filled tubular element that is shaped as a box;

wherein said tubular element shaped as a box comprises an internal tubular wall which is provided with external longitudinal slots for permitting passage of power supply wires to the stator winding pack; and wherein said internal tubular wall is provided with an internal longitudinal slot for permitting passage of connecting wires to plates of the capacitor.

2. A single-phase split-capacitor submersible motor for submersed pumps, comprising:

an elongated submersible body;

a pump coupling head located at an end of said elongated body, the body and the coupling head defining a stator chamber;

a stator winding pack disposed in the stator chamber, the stator winding pack including a main field winding and an auxiliary winding, the stator winding pack with power supply wires for connection to a power supply; and a permanently connected annular film capacitor coupled in series with the auxiliary winding, the capacitor located in the stator chamber axially disposed between the pump coupling head and the stator winding pack;

wherein said annular film capacitor comprises longitudinally elongated plates wound around a tubular support and contained within a resin-filled tubular box-like element;

wherein said tubular box-like element comprises a tubular wall that is provided with external longitudinal slots for permitting passage of power supply wires and internal longitudinal slots for passage of electrical connection wires.

3. A single-phase submersible motor for submersed pumps, comprising:

an elongated submersible body;

a pump coupling head located at an end of said elongated body, the body and the coupling head defining a stator chamber;

a stator winding pack disposed in the stator chamber, the stator winding pack including a main field winding, an auxiliary winding and power supply wires for connection to a power supply; and a permanently connected annular film capacitor coupled in series with the auxiliary winding, the capacitor located in the stator chamber axially interposed between the pump coupling head and the stator winding pack, said capacitor comprising a tubular box shaped element having an internal wall, a tubular support, a longitudinally elongated film capacitor wound around said tubular support and contained in said tubular box shaped element, and electrical connection wires;

wherein said internal tubular wall is provided with external longitudinal slots for permitting passage of the power supply wires to the stator winding pack and an internal longitudinal slot for permitting passage of the electrical connection wires to plates of the capacitor.

* * * * *